(12) United States Patent
Jansen

(10) Patent No.: US 11,686,682 B2
(45) Date of Patent: Jun. 27, 2023

(54) DEVICE FOR COLLECTING FLUORESCENT LIGHT EMITTED BY PARTICLES IN A MEDIUM

(71) Applicant: miDiagnostics NV, Leuven (BE)

(72) Inventor: Roelof Jansen, Leuven (BE)

(73) Assignee: miDiagnostics NV, Heverlee (BE)

(*) Notice: Subject to any disclaimer, the term of this patent is extended or adjusted under 35 U.S.C. 154(b) by 950 days.

(21) Appl. No.: 16/471,555

(22) PCT Filed: Dec. 12, 2017

(86) PCT No.: PCT/EP2017/082391
§ 371 (c)(1),
(2) Date: Jun. 19, 2019

(87) PCT Pub. No.: WO2018/114475
PCT Pub. Date: Jun. 28, 2018

(65) Prior Publication Data
US 2020/0371030 A1  Nov. 26, 2020

(30) Foreign Application Priority Data

Dec. 21, 2016 (EP) .................................... 16205663

(51) Int. Cl.
*G01N 21/64* (2006.01)
*G02B 6/293* (2006.01)
(Continued)

(52) U.S. Cl.
CPC .......... *G01N 21/648* (2013.01); *G01N 15/06* (2013.01); *G02B 6/12004* (2013.01);
(Continued)

(58) Field of Classification Search
CPC .......................... G01N 21/648; G01B 6/29332
See application file for complete search history.

(56) References Cited

U.S. PATENT DOCUMENTS 5,569,911 A  10/1996  Tomlinson, Jr. et al.
6,075,611 A   6/2000  Dussan V et al.
(Continued)

FOREIGN PATENT DOCUMENTS

JP  2012525595 A  10/2012
JP  2014520258 A   8/2014

*Primary Examiner* — Joseph L Williams
(74) *Attorney, Agent, or Firm* — Hodgson Russ LLP

(57) ABSTRACT

There is provided a device (300;500;700) for collecting fluorescent light (322) emitted by particles (304) in a medium (302). The device (300;500;700) comprises a substrate (308) having a chamber (306) for holding the medium (302) including the particles (304) being capable of emitting fluorescent light (322). A first waveguide (310), which is arranged to receive and guide excitation light along a first direction (313), extends through the chamber (306). Fluorescent light (322) emitted by the particles (304) following an excitation is collected by the first waveguide (310). The device (300;500;700) further comprises a coupler (316;516) which includes a second waveguide (317) arranged to output collected fluorescent light (326) at one of its ends (318). The second waveguide (317) is arranged in relation to the first waveguide (310) such that collected fluorescent light (324) travelling in a direction opposite to the first direction (312) is coupled out from the first waveguide (310) directly into the second waveguide (317).

10 Claims, 7 Drawing Sheets

(51) Int. Cl.
*G01N 15/06* (2006.01)
*G02B 6/12* (2006.01)
*G02B 6/28* (2006.01)

(52) U.S. Cl.
CPC ....... *G02B 6/12007* (2013.01); *G02B 6/2813* (2013.01); *G02B 6/29332* (2013.01); *G01N 2015/0693* (2013.01); *G02B 2006/12147* (2013.01)

(56) References Cited

U.S. PATENT DOCUMENTS

| | | |
|---|---|---|
| 2003/0029995 A1 | 2/2003 | Mullins et al. |
| 2008/0212918 A1 | 9/2008 | Babin |
| 2013/0071850 A1 | 3/2013 | Duer |
| 2016/0356708 A1 | 12/2016 | Bennett et al. |

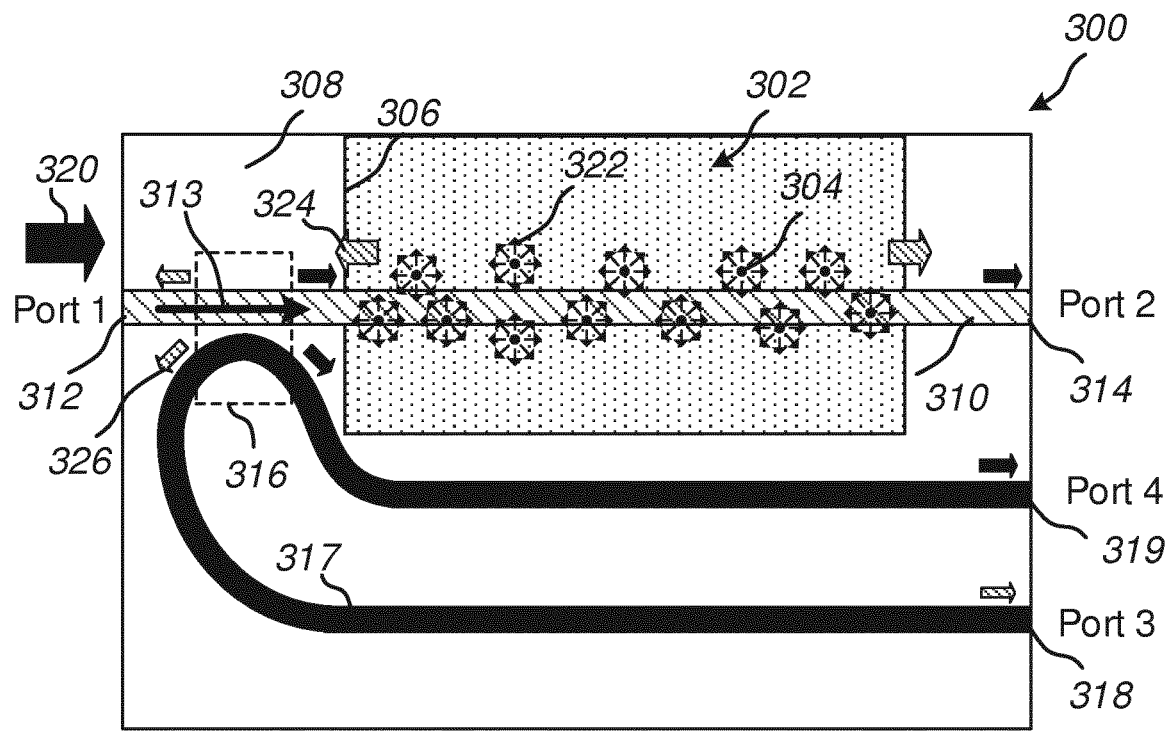
Fig. 3
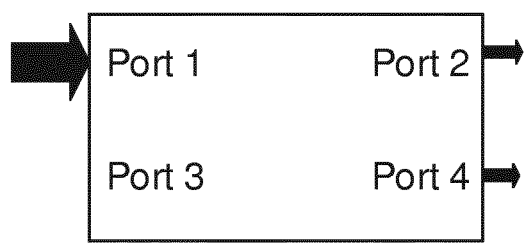 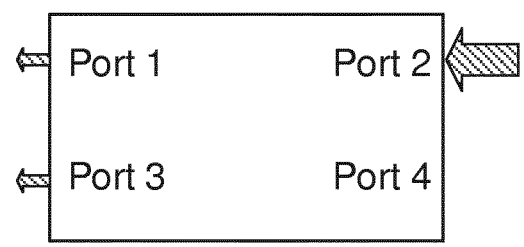
Fig. 4a Fig. 4b

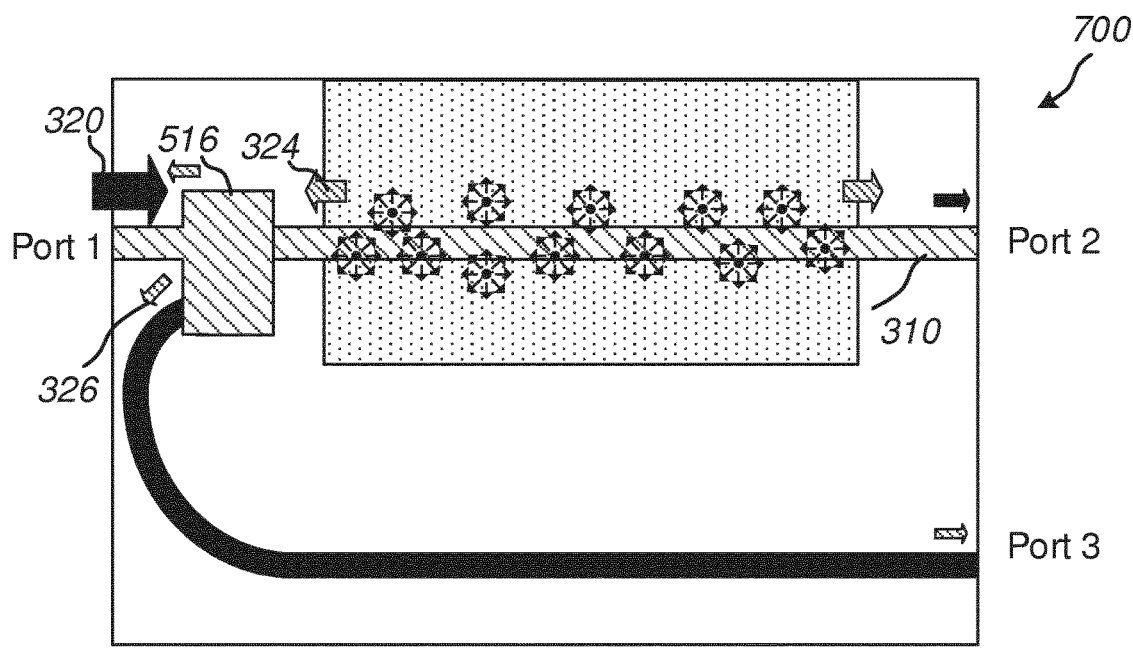
Fig. 7
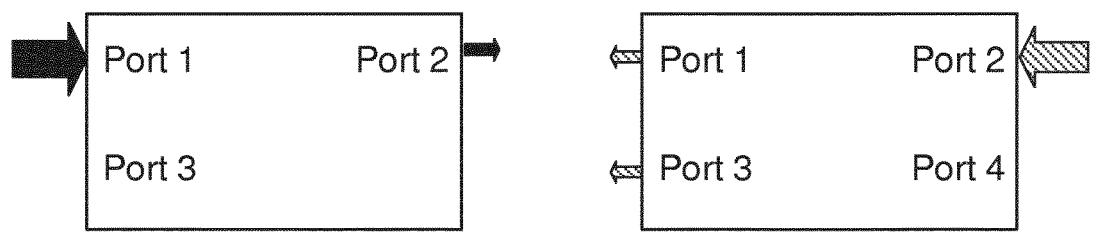
Fig. 8a        Fig. 8b
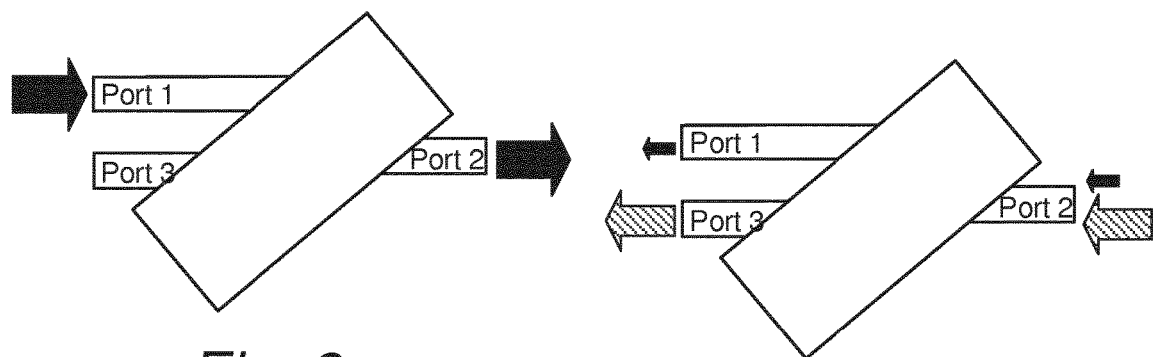
Fig. 9a
Fig. 9b

DEVICE FOR COLLECTING FLUORESCENT LIGHT EMITTED BY PARTICLES IN A MEDIUM

TECHNICAL FIELD

Exemplary embodiments relate to a method and a device for collecting fluorescent light emitted by particles in a medium.

BACKGROUND

There is an increasing demand for compact diagnostic devices where patients themselves measure the concentration of various types of particles in body fluids, such as molecules in blood or urine. Generally, a body fluid may be seen as a fluid medium which includes particles, such as molecules, of different types. The concentration of the particles may be measured using fluorescence, i.e., the particles may be subject to light which serves to excite the particles, whereby the particles emit fluorescent light which is then collected in order to detect the concentration of particles in the medium. Some particles in the body fluids may have a natural capability of emitting fluorescent light. However, if this is not the case, it is also possible to stain the particles by a fluorescent dye, i.e., a dye which binds to the particles and which is capable of emitting fluorescent light.

Evanescent fields of optical waveguides have been used for excitation of various types of emitting particles, including fluorescent dyes. For example, an optical waveguide carrying excitation light may be passed through a medium comprising emitting particles. The same waveguide can then be used to collect the emitted light and guide it to a detector.

FIG. 1a and FIG. 1b illustrate this principle. A medium 102 comprising particles 104 is held by a chamber 106 of a substrate 108. A waveguide 110 is arranged at the substrate 108 such that it extends through the chamber 106. Excitation light 120 is input to the waveguide 110 at a first end 112, referred to herein as Port 1. The excitation light 120 gives rise to an evanescent field around the waveguide 110 which causes excitation of the particles 104. As a result, the particles 104 emit fluorescent light 122 which is collected by the waveguide 112. The collected fluorescent light 124, and the excitation light 120 that remains after the passage through the waveguide are then output at a second end 114 of the waveguide, referred to herein as Port 2, for detection.

The waveguide 110 thus guides both the excitation light 120 and the collected fluorescent light 124. Since the power of the excitation light 120 typically is orders of magnitude larger than the power of the collected fluorescent light 124, the excitation light needs to be filtered out, e.g., by means of a strong rejection filter, in order to allow the collected emitted light to be detected. Such filters are, due to their size, impractical in many cases, such as when a compact system is desired. There is thus room for improvements.

SUMMARY

There is provided a device for collecting fluorescent light emitted by particles in a medium. Instead of outputting the collected fluorescent light together with the excitation light at an output port of the waveguide, the collected fluorescent light travelling in a direction opposite to the excitation light in the waveguide is coupled out directly into a further waveguide for detection. In this way, there is no need for a rejection filter.

BRIEF DESCRIPTIONS OF THE DRAWINGS

The above, as well as additional objects, features and advantages, will be better understood through the following illustrative and non-limiting detailed description of embodiments described herein, with reference to the appended drawings, where the same reference numerals will be used for similar elements, wherein:

FIG. 1a schematically illustrates a side view of a device for collecting fluorescent light emitted by particles in a medium according to prior art.

FIG. 1b schematically illustrates a top view of the device of FIG. 1a.

FIG. 2 illustrates collected signal power as a function of waveguide length for two different concentrations when the prior art device of FIGS. 1a and 1b is used.

FIG. 3 schematically illustrates a top view of a device for collecting fluorescent light emitted by particles in a medium according to a first group of embodiments.

FIGS. 4a and 4b schematically illustrate the functionality of a directional coupler.

FIG. 5 schematically illustrates a top view of a device for collecting fluorescent light emitted by particles in a medium according to a second group of embodiments.

FIGS. 6a, 6b, 6c schematically illustrate the functionality of a wavelength splitter.

FIG. 7 schematically illustrates a top view of a device for collecting fluorescent light emitted by particles in a medium according to a third group of embodiments.

FIGS. 8a and 8b schematically illustrate the functionality of a multi-mode interference (MMI) coupler.

FIGS. 9a and 9b schematically illustrate the functionality of a MMI coupler of wavelength selective type.

FIG. 10 schematically illustrates the functionality of a MMI coupler of wavelength selective type having several output ports to which light of different wavelengths are output.

DETAILED DESCRIPTION

I. Overview

Figure 1A:
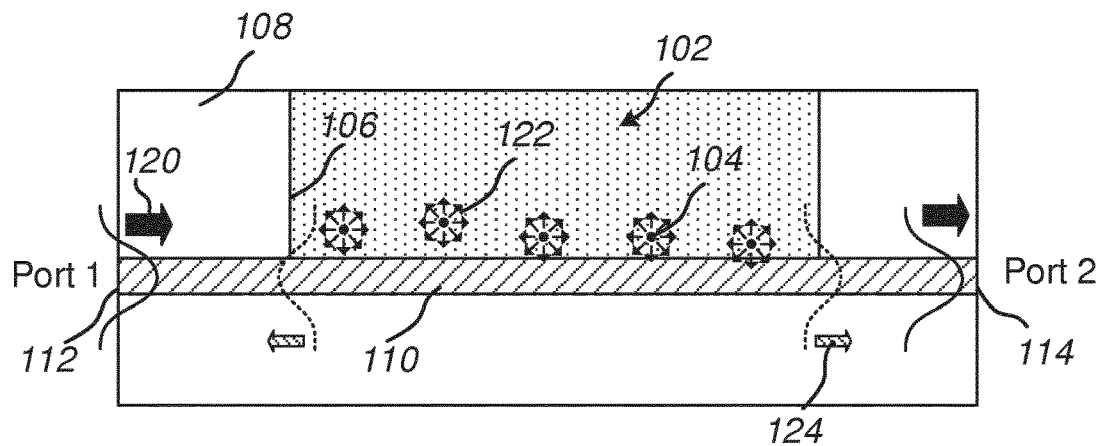

It is an object to, at least partly, solve the problems discussed above, and in particular to provide a device, system, and a method for collecting fluorescent light emitted by particles in a medium that allows for integration in a compact system.

According to a first aspect, there is provided a device for collecting fluorescent light emitted by particles in a medium, comprising: a substrate having a chamber for holding a medium including particles being capable of emitting fluorescent light, a first waveguide arranged at the substrate and extending into the chamber, wherein the first waveguide is arranged to receive excitation light from a light source and guide the excitation light through the chamber along a first direction of the first waveguide, and to collect fluorescent light emitted by the particles following an excitation of the particles by the excitation light, and a coupler arranged at the first waveguide, wherein the coupler includes a second waveguide arranged to output collected fluorescent light at one of its ends, and wherein the second waveguide is arranged in relation to the first waveguide such that collected fluorescent light travelling in a direction opposite to the first direction is coupled out from the first waveguide directly into the second waveguide.

With this arrangement, collected fluorescent light travelling in the direction opposite to the excitation light is coupled out from the first waveguide directly into a second waveguide which outputs the collected fluorescent light. In this way, the collected fluorescent light is separated from the excitation light in a convenient manner such that there is no need for any bulky components such as a rejection filter.

The collected fluorescent light is coupled out from the first waveguide directly into the second waveguide. This means that the light goes directly from the first waveguide to the second waveguide without passing via a further waveguide. In some embodiments, the direct coupling is achieved by overlapping evanescent fields of the first and the second waveguide. In other embodiments, the coupler relies on an interference pattern of multiple modes supported by the coupler in order to couple out light from the first waveguide directly into the second waveguide.

By excitation light is meant light having a wavelength which is suitable for excitation of the particles in the medium, thereby causing the particles to emit fluorescent light.

The particles may have a natural capability of emitting fluorescent light. However, it is also possible that the particles are stained by a fluorescent dye, i.e., a dye which binds to the particles and which is capable of emitting fluorescent light.

The coupler may be arranged at the first waveguide upstream of the chamber in relation to the first direction. Thus, the coupler is arranged before the chamber, i.e., between the end of the first waveguide where excitation light is received and the chamber.

The power in the first waveguide is at its highest levels where the first waveguide enters the chamber, meaning that this is where most light is emitted and collected per waveguide length. The excitation light and the collected fluorescent light are then attenuated as they propagate along the first waveguide due to waveguide losses and absorption by particles in the medium. Accordingly, by arranging the coupler upstream of the chamber, the coupler is located close to the entrance of the first waveguide into the chamber where most fluorescent light is collected per waveguide length, thus giving rise to an as strong signal as possible. Further, the collected fluorescent light will have a short path to travel back to the coupler, meaning that the collected fluorescent light is basically un-attenuated as it reaches the coupler. This location of the coupler in relation to the chamber thus serves to optimize the power of the collected fluorescent light which is coupled out from the first waveguide.

Figure 1B:
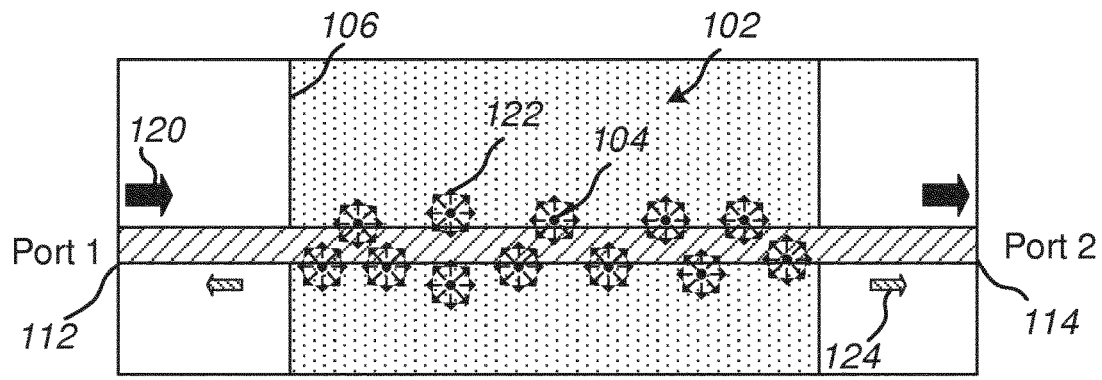

In prior art systems, such as the one illustrated in FIGS. 1a and 1b, there is a need for finding an optimal length of the waveguide in order to maximize the total collected fluorescent light which is output of the first waveguide, thereby balancing the power of the light that is collected along the first waveguide in relation to the collected light that is lost due to attenuation or absorption. In brief, for each waveguide attenuation, there is a single optimum length of the first waveguide which maximizes the power of the collected fluorescent light at the output. Furthermore, if part of the absorption is due to re-absorption of the collected light by the particles, the optimum length will be different for different concentrations of the particles.

Figure 2:
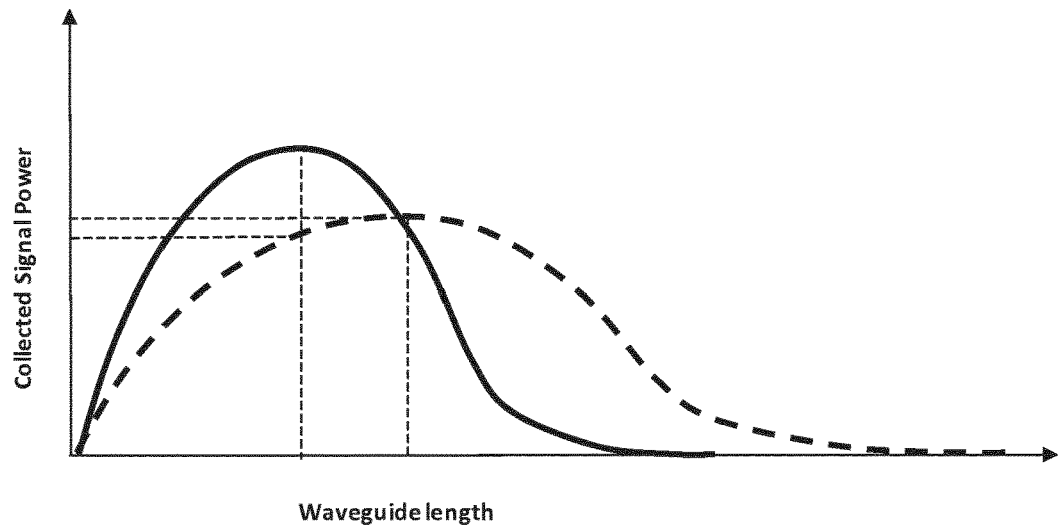

This is further illustrated in FIG. 2, which shows the collected signal power of the fluorescent light collected at the second end 114, Port 2, of FIGS. 1a and 1b as a function of the length of the waveguide 110. The solid curve corresponds to a first concentration of particles whereas the dashed curve corresponds to a second, lower, concentration of particles. Notably, the collected signal power for the solid curve, corresponding to the higher concentration, peaks for a lower waveguide length than the dashed curve, corresponding to the lower concentration. The optimal waveguide length is thus lower for a higher concentration in relation to the optimal waveguide length for a lower concentration, thus illustrating that there are different optimal waveguide lengths for different concentrations when fluorescent light is collected at Port 2.

By arranging the coupler upstream of the chamber, the requirement of having a well-designed optimum length is removed since the power of the collected fluorescent light which reaches the coupler reaches a saturation when the waveguide is long enough.

The second waveguide may be arranged adjacent to the first waveguide, thereby allowing collected fluorescent light travelling in a direction opposite to the first direction to be coupled out from the first waveguide directly into the second waveguide. The coupling is achieved due to overlapping evanescent modes of the first and the second waveguides. This is an easy way of providing a direct coupling from the first to the second waveguide.

According to embodiments, the coupler is a directional coupler. A directional coupler is advantageous in that it is relatively insensitive to fabrication variations. Further, only a low amount of reflection is caused by the directional coupler. In other words, not much of the excitation light guided by the first waveguide in the first direction is scattered back from the first waveguide into the second waveguide.

In case of a directional coupler, a portion of the excitation light may also be coupled into the second waveguide. In particular, the second waveguide may be arranged to output collected fluorescent light at a first end, and excitation light, coupled into the second waveguide from the first waveguide, at a second end. By measuring the excitation light at the second end of the second waveguide and setting it in relation to the power of the excitation light being received by the first waveguide, the loss in the coupler may be determined.

According to embodiments, the coupler may be a wavelength splitter. In comparison to a directional coupler, a wavelength splitter is advantageous in that it has no, or at least very low, coupling losses. A directional coupler may have a coupling efficiency of 50%, whereas the wavelength splitter has a theoretical coupling efficiency of 100%. This wavelength splitter takes advantage of the wavelength difference between the excitation and the collected fluorescent light to optimally couple (up to 100%) each wavelength to the correct output port. The wavelength splitter also serves to separate back-scattered excitation light from the collected fluorescent light. In this way, the collected fluorescent light measured at the output of the second waveguide is not contaminated by back-scattered excitation light.

Alternatively, the coupler may be a multi-mode interference, MMI, coupler. An MMI coupler is advantageous in that it is insensitive to fabrication tolerances. Another advantage is that it is broadband, meaning that it has the same or similar properties, such as coupling efficiency, for the wavelengths of the excitation light and fluorescent light.

For example, the coupler may be a wavelength selective MMI. A wavelength selective MMI coupler is an MMI coupler which is designed to take advantage of the wavelength difference between the excitation and the collected fluorescent light such that the excitation power goes to one output port, and collected fluorescent power to another output port. In this way, the coupling efficiency is improved compared to a standard MMI coupler. The theoretical coupling efficiency for transmission is 100%. However, in practice there are some power losses which are in the order of 2 dB per port. Further, due to the wavelength selective property, backscattered excitation light and collected fluorescent are separated, meaning that the collected fluorescent light measured at the output of the second waveguide is not contaminated by back-scattered excitation light. A still further advantage is that, unlike the standard MMI coupler, but similar to the directional coupler, the wavelength selective MMI coupler causes little or no reflection of excitation light, meaning that not much of the excitation light guided by the first waveguide in the first direction is scattered back from the first waveguide into the second waveguide.

The length of the first waveguide may be selected independently of the concentration of particles capable of emitting fluorescent light in the medium. As further mentioned above, this is possible due to the coupler being arranged upstream of the chamber so as to couple out collected fluorescent light traveling in the direction opposed to the direction of the excitation light.

The substrate, the first waveguide and the coupler may be arranged on a disposable chip. This is made possible in view of the compactness, and low cost, of the components involved.

According to a second aspect, the above object is achieved by a system for detecting fluorescent light emitted by particles in a medium, comprising:

a device for collecting fluorescent light emitted by particles in a medium according to the first aspect, a light source coupled to the first waveguide of the device for input of excitation light to the first waveguide, and a detector coupled to the second waveguide of the device for detecting the collected fluorescent light which is output from one of the ends of the second waveguide.

The system may comprise a disposable part and a non-disposable part, the disposable part being arranged to be connected to the non-disposable part, wherein the light source and the detector are arranged on the non-disposable part, and the device is arranged on the disposable part.

In comparison to have the coupler on the non-disposable part, this is advantageous in that no integration step is needed to connect the disposable part and the non-disposable part photonically. Also, having the coupler on the disposable part does not incur any additional fabrication costs.

The coupler may be a directional coupler, and the second waveguide may be arranged to output collected fluorescent light at a first end, and excitation light, coupled into the second waveguide from the first waveguide, at a second end. The detector may further be coupled to the second end of the second waveguide for detecting light being output at said second end, and determining a loss of the directional coupler based on a power of the light detected at the second end of the second waveguide in relation to a power of the excitation light which is input to the first waveguide.

According to a third aspect, there is provided a diagnostic arrangement comprising the device according to the first aspect or the system of the second aspect.

According to a fourth aspect, there is provided a method for detecting fluorescent light emitted by particles in a medium, comprising:

receiving excitation light by a first waveguide and guiding the excitation light along a first direction of the first waveguide, wherein a portion of the first waveguide extends through a medium comprising the particles being capable of emitting fluorescent light, collecting, using the first waveguide, fluorescent light emitted by the particles following an excitation by the excitation light, coupling out, using a coupler arranged at the first waveguide, fluorescent light travelling in a direction opposite to the first direction from the first waveguide directly into a second waveguide of the coupler, and detecting, using a detector, the collected fluorescent light at one of the ends of the second waveguide.

The coupler may be a directional coupler, and the method may further comprise:

detecting light at a second end of the second waveguide, and determining a loss of the directional coupler based on a power of the detected light in relation to a power of the excitation light received by the first waveguide.

The second, third, and fourth aspects may generally have the same features and advantages as the first aspect. It is further noted that the inventive concepts relate to all possible combinations of features unless explicitly stated otherwise.

II. Exemplary Embodiments

Exemplary embodiments will now be described more fully hereinafter with reference to the accompanying drawings. The inventive concepts may, however, be embodied in many different forms and should not be construed as limited to the embodiments set forth herein; rather, these embodiments are provided for thoroughness and completeness, and fully convey the scope of the inventive concepts to the skilled person.

FIG. 3 illustrates a device 300 for collecting fluorescent light. The device 300 comprises a substrate 308 with a chamber 306, a first waveguide 310, a coupler 316 and a second waveguide 317.

Generally, the device 300 may be a photonic integrated circuit. The substrate 308 serves as a platform for the photonic integrated circuit. The substrate 308 may for example be a silicon chip or quartz chip, covered with an oxide with integrated photonics processed on top. In the substrate 308, there is formed a chamber 306. When in use, the chamber 306 holds a medium, such as a body fluid, comprising particles 304. The chamber 306, thus serves as a reservoir for holding a medium. According to embodiments, the chamber 306 may be in the form of a channel, such as micro-fluid channel, through which the medium may flow. The particles 304 are capable of emitting fluorescent light, either on their own motion or by means of a fluorescent dye which binds to the particles.

The first waveguide 310 is arranged at the substrate 308. For example, the first waveguide 310 may be integrated in the substrate 308, i.e., on the platform of the photonic integrated circuit. The first waveguide 310 extends into the chamber 306. In the illustrated embodiment, the first waveguide 110 extends from a first side of the substrate 308, into and through the chamber 306, and then to a second side of the substrate 308. However, in other embodiments, the waveguide 310 does not extend to a second side of the substrate, but rather follows a meandering path through the chamber 306 before ending inside the chamber 306.

The first waveguide 310 is arranged to receive light 320, referred to herein as excitation light, at a first end 312. The first end 312 may also be referred to as Port 1. The excitation light 320 may be received from a light source, such as one or more lasers, and may comprise a single or a plurality of distinct wavelengths which are suitable for causing excitation of the particles 304. The first waveguide 310 also has a second end 314, referred to herein as Port 2.

As excitation light is received 320, the first waveguide 310 guides the excitation light 320 in a first direction 313, here from left to right, of the first waveguide 310. Since the first waveguide 310 extends into and through the chamber 306, the first waveguide 310 thus guides the excitation light through the chamber 306.

The surface of the first waveguide 310 is an interface between two dielectrics, implying that the fields of the electromagnetic waves, i.e., the excitation light 320, guided by the first waveguide 310 penetrate outside the first waveguide 310 in the form of an evanescent wave or evanescent field. Due to the existence of the evanescent field, particles 304 which are in the vicinity of the first waveguide 310 may absorb photons of the excitation light 320, and then emit fluorescent light 322. The fluorescent light 322 has typically a spectrum of wavelengths corresponding to lower energies than the excitation light 320. A portion of the fluorescent light 322 is then collected by the first waveguide 310 and is guided in both directions of the first waveguide 310. The portion of the fluorescent light 322 that is collected is determined by the mode overlap between the waveguide mode and the fluorescent dipole mode.

The coupler 316 is arranged at the first waveguide 310. Preferably, the coupler 316 is arranged upstream of the chamber 306 with respect to the first direction 313, i.e., at the portion of the waveguide 310 extending between the first end 312 and the chamber 306.

The coupler 316 comprises a second waveguide 317. The second waveguide 317 is arranged in relation to the first waveguide 310 such that collected fluorescent light 324 travelling in a direction opposite to the first direction 313 is coupled out from the first waveguide 310 directly into the second waveguide 317. This may be accomplished by arranging the second waveguide 317 adjacent to the first waveguide 310. In this way, the evanescent field caused by the collected fluorescent light 324 which propagates in a direction opposite to the first direction 313 in the first waveguide 310 excites a wave in the second waveguide 317, thereby coupling out light from the first waveguide 310 to the second waveguide 317. The coupler 316 thus couples out collected fluorescent light 324 from the first waveguide 310 directly to the second waveguide 317 using evanescent wave coupling between the first waveguide 310 and the second waveguide 317. The coupler 316 may therefore be referred to as an evanescent coupler.

The second waveguide 317 is arranged to output, at one of its ends, fluorescent light 326 that has been coupled into the second waveguide 317. In particular, the second waveguide 317 has a first end 318, also referred to herein as Port 3, at which the collected fluorescent light 326 is output. In other words, the collected fluorescent light 326 may be directly measured at the first end 318, Port 3, of the second waveguide 317. The second waveguide 317 also has a second end 319, which is referred to herein as Port 4.

According to one embodiment, the coupler 316 is a directional coupler. The directional coupler is associated with a coupling loss. In more detail, the excitation light 320 entering at Port 1 will be split into two portions, wherein one portion is transmitted via the first waveguide 310 to Port 2, and the other portion is coupled out to the second waveguide 317 and is output at Port 4. This is further illustrated in FIG. 4a. Similarly, the collected fluorescent light 324 propagating in the first waveguide 310 from the Port 2 direction, is split into two portions, wherein one portion is transmitted to via the first waveguide 310 to Port 1, and the other portion 326 is coupled out to the second waveguide 317 and is output at Port 3. This is further illustrated in FIG. 4b. In FIGS. 4a and 4b, and throughout the application, the solid arrows refer to excitation light, and the dashed arrows refer to fluorescent light.

By measuring the power of the signal at Port 4 in relation to the power of which is input at Port 1, the coupling efficiency of the directional coupler may be determined.

Figure 5:
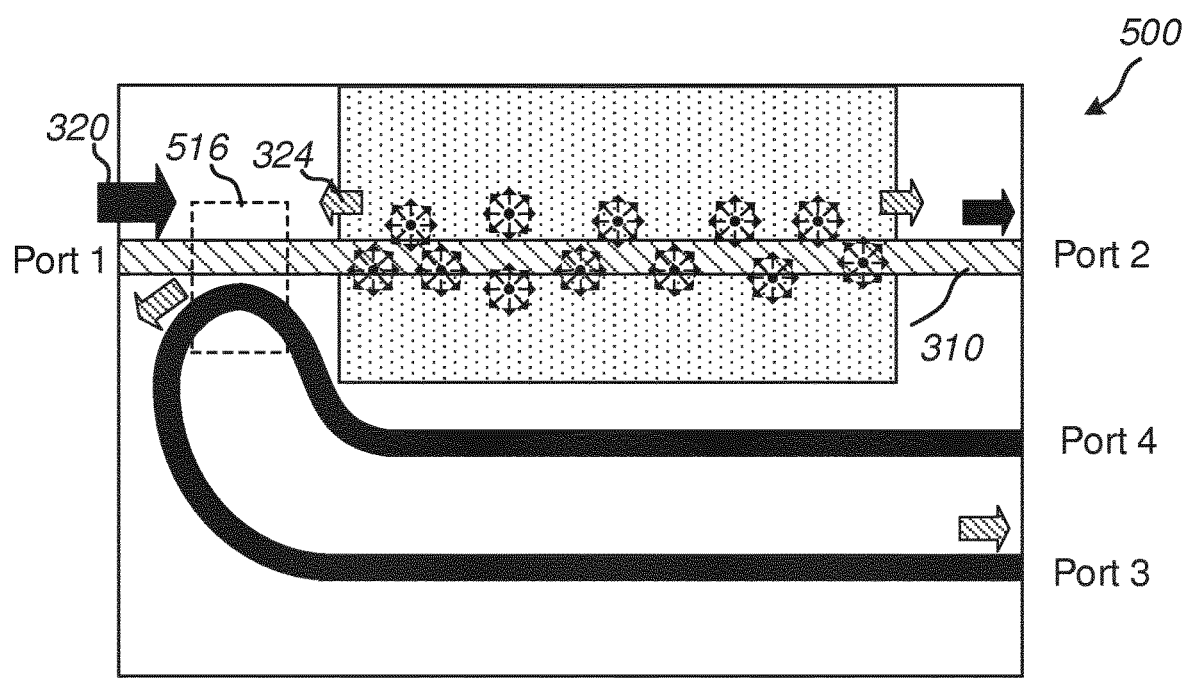
Figure 6A:
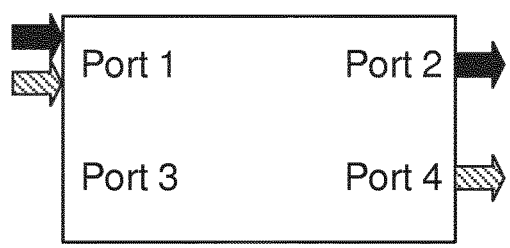

FIG. 5 illustrates a device 500 for collecting fluorescent light according to another embodiment. The embodiment of FIG. 5 differs from the embodiment of FIG. 3 in that the coupler 516 is a wavelength splitter instead of a directional coupler. If two signals of different wavelengths are input at a common port of a wavelength splitter, the wavelength splitter will transmit one of the wavelengths with 100% efficiency to a first port, and couple out the other wavelength with 100% efficiency to another port. This is further illustrated in FIG. 6a.

Figures 6B, 6C:
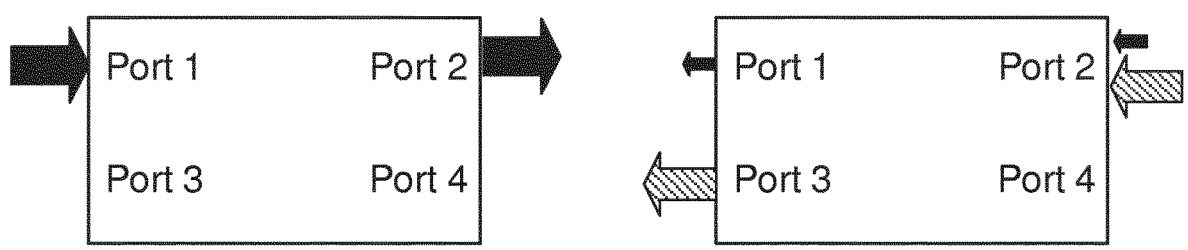

When used in the device 500, the wavelength splitter 516 will thus transmit the excitation light 320 input at Port 1 via the first waveguide 310 to Port 2. This is further illustrated in FIG. 6b. Similarly, the collected fluorescent light 324 propagating in the first waveguide 310 from the Port 2 direction, is coupled out with 100% efficiency to the second waveguide 317 and is output at Port 3. This is further illustrated in FIG. 6c. In FIG. 6c it is also indicated (by means of the solid arrows) that some of the excitation light 320 is back-scattered such that a small amount of excitation light propagates backwards in the first waveguide 310 towards the coupler 516 (this was omitted in FIG. 4b). Due to the wave-length splitting properties of the wavelength splitter 516, the back-scattered excitation light is transmitted to Port 1 instead of being coupled out to Port 3. Thus the power of the signal detected at Port 3 only stems from collected fluorescent light and is not contaminated by back-scattered excitation light. The wavelength splitter thus has an improved efficiency over the directional coupler, and also separates back-scattered excitation light from collected fluorescent light.

FIG. 7 illustrates a device 700 for collecting fluorescent light according to yet another embodiment. The device 700 differs from the devices 300 and 500 in FIGS. 3 and 5 in that the coupler 716 is a multi-mode interference coupler (MMI). The MMI is another example of how to couple the collected fluorescent light 324 from the first waveguide 310 directly into the second waveguide 317. The MMI is an example of a coupler which relies on the interference pattern of the multiple of modes supported in the MMI in order to couple out light from the first waveguide 310 directly into the second waveguide 317.

An MMI coupler basically consists of a broad, slab guide like structure which supports multiple modes. The interference pattern of theses modes is leveraged. By choosing the dimensions of the slab guide, the image at the entrance waveguide is imaged at the exit waveguide(s).

When used in the device 700, the MMI coupler 716 transmits the excitation light 320 input at Port 1 via the first waveguide 310 to Port 2. This is further illustrated in FIG. 8a. The transmission is lossy and about 50% of the poser of the excitation light 320 is transmitted from Port 1 to Port 2. The collected fluorescent light 324 propagating in the first waveguide 310 from the Port 2 direction, is split into two even sized portions, wherein one portion is transmitted via the first waveguide 310 to Port 1, and the other portion is coupled out to the second waveguide 317 and is output at Port 3. This is further illustrated in FIG. 8b. Although the MMI coupler 716 operates according to another physical principle, its function is thus similar to the directional coupler described in conjunction to FIG. 3, FIG. 4a, and FIG. 4b.

The MMI coupler 716 may also be of wavelength selective type. An MMI coupler of wavelength selective type is more similar in function to a wavelength splitter rather than a directional coupler. In particular, it is designed such that the excitation light 320 is output to one port, and the collected fluorescent light is output to another port.

Figure 10:
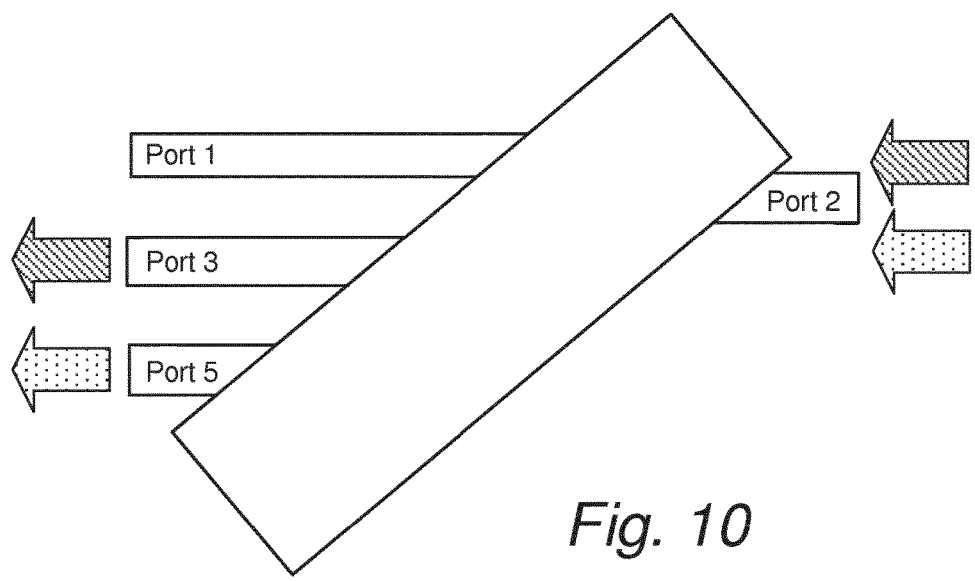

When used in the device 700, an MMI coupler of wavelength selective type will transmit the excitation light 320 input at Port 1 via the first waveguide 310 to Port 2. This is further illustrated in FIG. 9a. Similarly, the collected fluorescent light 324 propagating in the first waveguide 310 from the Port 2 direction, is coupled out with up to 100% efficiency to the second waveguide 317 and is output at Port 3. This is further illustrated in FIG. 9b. In FIG. 9b it is also indicated (by means of the solid arrows) that some of the excitation light 320 is back-scattered such that a small amount of excitation light propagates backwards in the first waveguide 310 towards the coupler 716. Due to the wavelength splitting properties of the wavelength selective MMI, the back-scattered excitation light is transmitted to Port 1 instead of being coupled out to Port 3. Thus the power of the signal detected at Port 3 only stems from collected fluorescent light and is not contaminated by back-scattered excitation light. The wavelength selective MMI thus has an improved efficiency over the standard MMI of FIGS. 8a and 9b, and also separates backscattered excitation light from collected fluorescent light. The wavelength selective MMI coupler may also comprise further output ports, wherein the MMI coupler is arranged to output different wavelengths to different ports. For example, the wavelength selective MMI coupler may comprise a third waveguide to which collected fluorescent light is directly coupled, wherein fluorescent light of a first wavelength is coupled to the second waveguide, and fluorescent light of a second wavelength is coupled to the third waveguide. This is further illustrated in FIG. 10, where fluorescent light of a first wavelength (dashed arrow) is coupled to the second waveguide, labelled Port 3, and fluorescent light of the second wavelength (dotted arrow) is coupled to the third waveguide, labelled Port 5. This is useful in case there are different types of fluorescent particles in the medium, e.g., particles stained by two different fluorescent dyes which emits fluorescent light at different wavelengths. Fluorescent light stemming from the first type of fluorescent particles is then coupled out to the second waveguide, Port 3, whereas fluorescent from the second type of fluorescent particles is coupled out to the third waveguide, Port 5.

Figure 11:
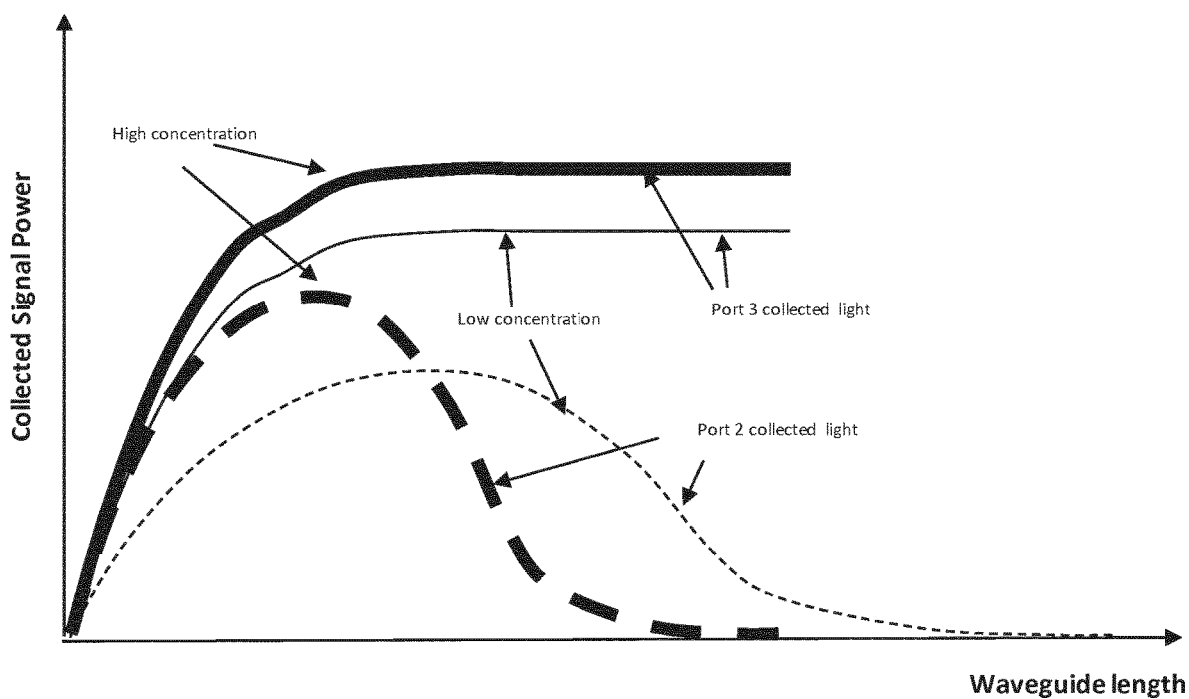
FIG. 11 illustrates collected signal power as a function of waveguide length for two different concentrations when a device according to exemplary embodiments is used, in comparison to when the prior art device of FIGS. 1a and 1b is used.

FIG. 11 shows collected signal power at Port 3 as a function of waveguide length for two different particle concentrations. For reference, the collected signal power measured at Port 2 using the prior art device of FIGS. 1a and 1b for the same two concentrations are also shown. With Port 2 collection, as explained with reference to FIG. 2, there is an optimal waveguide length for each concentration. However, this is not the case if the fluorescent light instead is collected at Port 3 in accordance to what has been explained above with reference to FIGS. 3-10. As is seen in FIG. 11, the power of the collected light saturates as the length of the first waveguide reaches a certain level. Moreover, that certain level is independent of the particle concentration. Thus, with Port 3 collection, it is possible to select the length of the first waveguide independently of the particle concentration. A single, "long enough", waveguide may be used to capture all concentrations.

Figure 12:
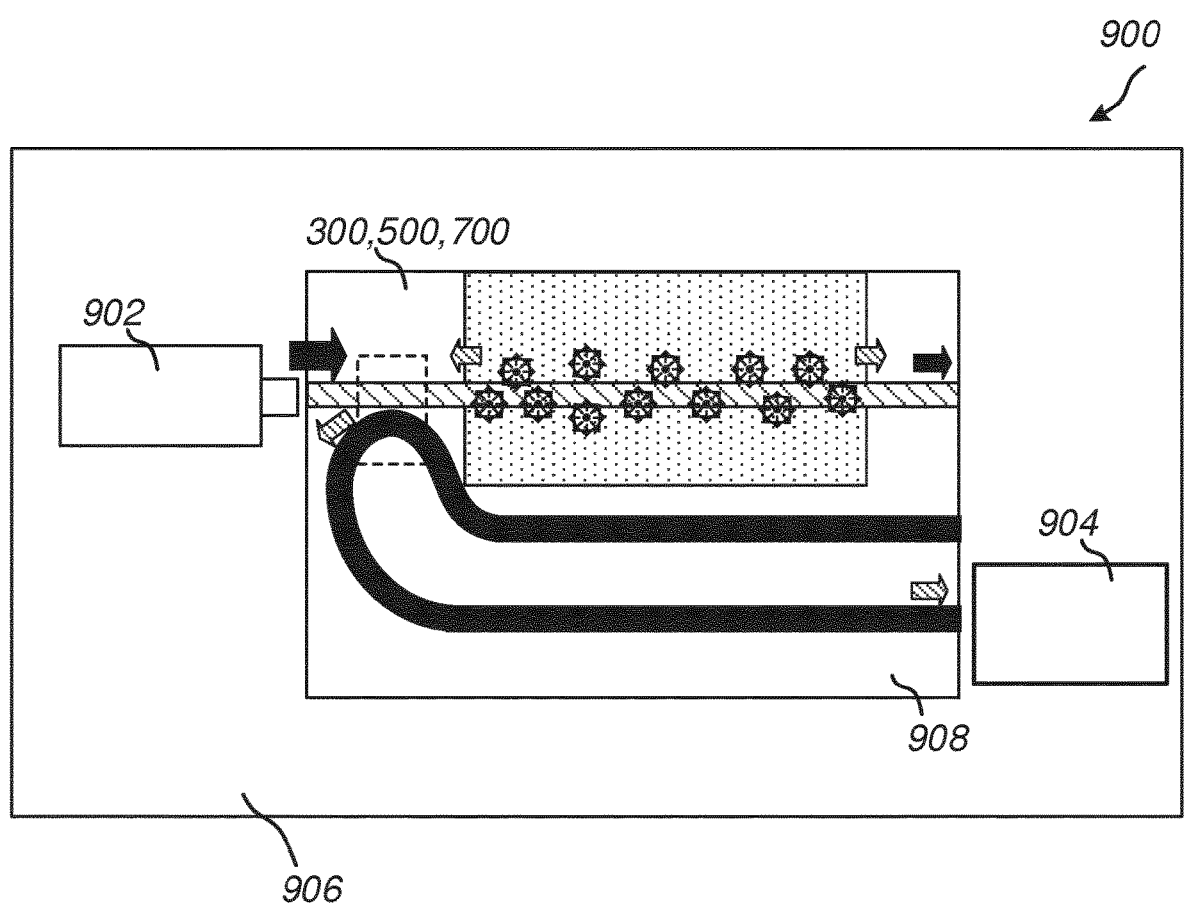
FIG. 12 illustrates a system for detecting fluorescent light emitted by particles in a medium according exemplary embodiments.

The device described with reference to FIGS. 3-10 may further be part of a system for detecting fluorescent light emitted by particles in a medium. FIG. 12 illustrates such a system 900. The system comprises a device 300, 500, 700 (the device 300 is illustrated, but it is understood that also the devices 500, 700 could be used), a light source 902, preferably a laser, and a detector 904. The detector 904 could, e.g., be an imager.

The light source 902 may be coupled to the first waveguide of the device 300, 500, 700, for input of excitation light to the first waveguide. The detector 904 may be coupled to the second waveguide of the device 300, 500, 700 for detecting the collected fluorescent light which is output from Port 3 of the device. It is also possible to couple the detector to Port 2 and Port 4 (if present) of the device to detect signal power at these output ports as well, e.g., in order to determine coupling efficiency in case of a directional coupler as previously described.

The system 900 typically comprises a non-disposable part 906, intended to be used more than one time, and a disposable part 908, intended for single use only. The disposable part 908 may be releasably connected to the non-disposable part. The more costly and bulky components, here the light source 902 and the detector 904, are arranged on the non-disposable part 908. The device 300, 500, 700 is, however, arranged on the disposable part 908.

The device 300, 500, 700, and the system 900 may form part of a diagnostic device. For example, the device may form part of a diagnostic device which measures the concentration of particles in a body fluid.

Figure 13:
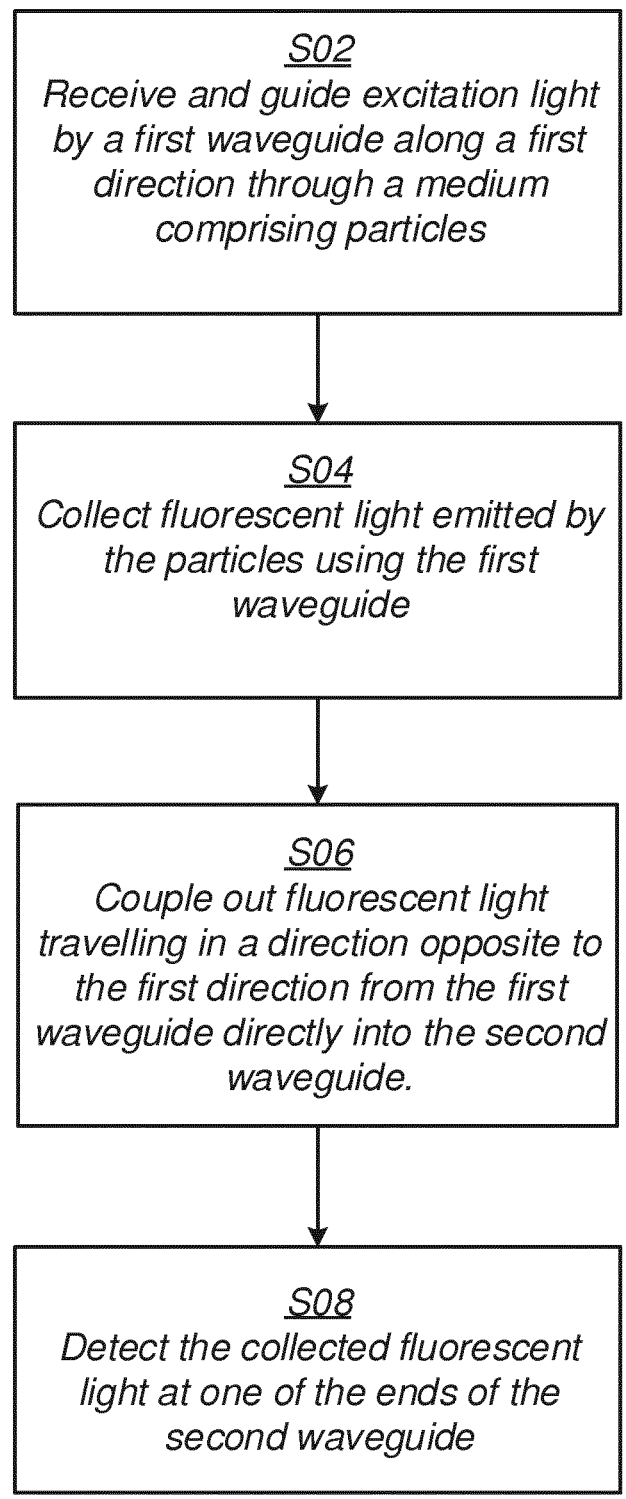
FIG. 13 is a flowchart of a method according to embodiments.

The operation of the device 300, 500, 700, and the system 900 will now be described with reference to FIGS. 3, 5, 7, 12 and the flowchart of FIG. 13.

In a first step, S02, the first waveguide 310 receives excitation light 320 and guides the excitation light 320 along a first direction 313 of the first waveguide 310. The excitation light 320 is received from a light source, such as the light source 902 of FIG. 9. As previously explained, there will be an evanescent field around the first waveguide 310 which, since the first waveguide extends through the medium 302, makes it possible for the particles 304 to absorb photons of the excitation light 320. Following the absorption, the particles 304 then emit fluorescent light 322.

In a next step, S04, fluorescent light 322 emitted by the particles is collected by the first waveguide 310. Step S04 is something that happens due to interaction between the emitted fluorescent light 322 and the first waveguide 310.

In step S06, fluorescent light 324 that travels in a direction opposite to the first direction in the first waveguide is coupled out, by means of coupler 316, 516, 716, from the first waveguide 310 directly into a second waveguide 317 as previously explained.

In step S08, the collected fluorescent light is detected, by means of detector 904, at Port 3 of the second waveguide 317.

In case the coupler is a directional coupler 316, the method may also comprise detecting light at a second end of the second waveguide, and determining a loss of the directional coupler based on a power of the detected light in relation to a power of the excitation light received by the first waveguide.

The embodiments herein are not limited to the above described examples. Various alternatives, modifications and equivalents may be used. The wavelength splitter, the MMI and the directional coupler may be seen as examples of basic spectrometers. In principle, other types of spectrometers would also be possible to use, such as a spectrometer of echelle grating type, or of an arrayed waveguide grating type. Therefore, this disclosure should not be limited to the specific form set forth herein. This disclosure is limited only by the appended claims and other embodiments than the mentioned above are equally possible within the scope of the claims.

The invention claimed is:

1. A device for collecting fluorescent light emitted by particles in a medium, comprising:
   a substrate having a chamber for holding a medium including particles being capable of emitting fluorescent light,
   a first waveguide arranged at the substrate and extending into the chamber,
   wherein the first waveguide is arranged to receive excitation light from a light source and guide the excitation light through the chamber along a first direction of the first waveguide, and to collect fluorescent light emitted by the particles following an excitation of the particles by the excitation light, and
   a coupler arranged at the first waveguide,
   wherein the coupler is a directional coupler and includes a second waveguide arranged to output collected fluorescent light at one of its ends, and
   wherein the second waveguide is arranged in relation to the first waveguide such that collected fluorescent light travelling in a direction opposite to the first direction is coupled out from the first waveguide directly into the second waveguide and to output collected fluorescent light at a first end, and excitation light, coupled into the second waveguide from the first waveguide, at a second end.

2. The device of claim 1, wherein the coupler is arranged at the first waveguide upstream of the chamber in relation to the first direction.

3. The device of claim 1, wherein the second waveguide is arranged adjacent to the first waveguide, thereby allowing collected fluorescent light travelling in a direction opposite to the first direction to be coupled out from the first waveguide directly into the second waveguide.

4. The device of claim 1, wherein the substrate, the first waveguide and the coupler are arranged on a disposable chip.

5. A system for detecting fluorescent light emitted by particles in a medium, comprising:
   a device for collecting fluorescent light emitted by particles in a medium according to claim 1,
   a light source coupled to the first waveguide of the device for input of excitation light to the first waveguide, and
   a detector coupled to the second waveguide of the device for detecting the collected fluorescent light which is output from one of the ends of the second waveguide.

6. The system of claim 5, wherein the system comprises a disposable part and a non-disposable part, the disposable part being arranged to be connected to the non-disposable part,
   wherein the light source and the detector are arranged on the non-disposable part, and the device is arranged on the disposable part.

7. The system of claim 5,
   wherein the detector is coupled to the second end of the second waveguide for detecting light being output at said second end, and determining a loss of the directional coupler based on a power of the light detected at the second end of the second waveguide in relation to a power of the excitation light which is input to the first waveguide.

8. A diagnostic arrangement comprising the device of claim 5.

9. A diagnostic arrangement comprising the device according to claim 1.

10. A method for detecting fluorescent light emitted by particles in a medium, comprising:
    receiving excitation light by a first waveguide and guiding the excitation light along a first direction of the first waveguide, wherein a portion of the first waveguide extends through a medium including the particles being capable of emitting fluorescent light,
    collecting, using the first waveguide, fluorescent light emitted by the particles following an excitation by the excitation light,
    coupling out, using a directional coupler arranged at the first waveguide, fluorescent light travelling in a direction opposite to the first direction from the first waveguide directly into a second waveguide of the coupler,
    detecting, using a detector, the collected fluorescent light at one of the ends of the second waveguide,
    detecting light at a second end of the second waveguide, and
    determining a loss of the directional coupler based on a power of the detected light in relation to a power of the excitation light received by the first waveguide.

* * * * *